United States Patent
Lee et al.

(10) Patent No.: US 8,787,951 B2
(45) Date of Patent: Jul. 22, 2014

(54) APPARATUS AND METHOD FOR TRANSMITTING MESSAGE IN THE COMMUNICATION SYSTEM

(75) Inventors: Mi-Sun Lee, Gyeonggi-do (KR); Sung-Jo Oh, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 13/302,069

(22) Filed: Nov. 22, 2011

(65) Prior Publication Data
US 2012/0129502 A1    May 24, 2012

(30) Foreign Application Priority Data
Nov. 22, 2010   (KR) .................. 10-2010-0116017

(51) Int. Cl.
*H04W 4/00*     (2009.01)
*H04W 4/12*     (2009.01)
*H04W 4/14*     (2009.01)

(52) U.S. Cl.
CPC .. *H04W 4/12* (2013.01); *H04W 4/14* (2013.01)
USPC .............. 455/466; 455/412.1; 455/412.2

(58) Field of Classification Search
None
See application file for complete search history.

(56) References Cited

U.S. PATENT DOCUMENTS

| | | |
|---|---|---|
| 2005/0143104 A1 | 6/2005 | Kim |
| 2006/0276200 A1* | 12/2006 | Radhakrishnan et al. . 455/456.1 |
| 2007/0191043 A1* | 8/2007 | Shapira et al. ................ 455/522 |
| 2007/0288574 A1* | 12/2007 | Koster et al. ................... 709/206 |
| 2008/0192746 A1* | 8/2008 | DiPietro et al. ............... 370/392 |
| 2008/0274741 A1* | 11/2008 | Liao et al. ..................... 455/436 |
| 2009/0232148 A1* | 9/2009 | Endo et al. .................... 370/401 |
| 2010/0056109 A1* | 3/2010 | Wilson et al. .............. 455/412.1 |

* cited by examiner

Primary Examiner — Suhail Khan
(74) Attorney, Agent, or Firm — Cha & Reiter, LLC

(57) ABSTRACT

An apparatus and method for transmitting a message in a mobile communication system is disclosed. The apparatus for transmitting a message in a portable terminal comprises a message generation unit for generating a message including contents corresponding to at least two recipients and for selectively selecting an intended user for the respective content, and a controller for controlling to transmit the message to the at least two recipients.

13 Claims, 7 Drawing Sheets

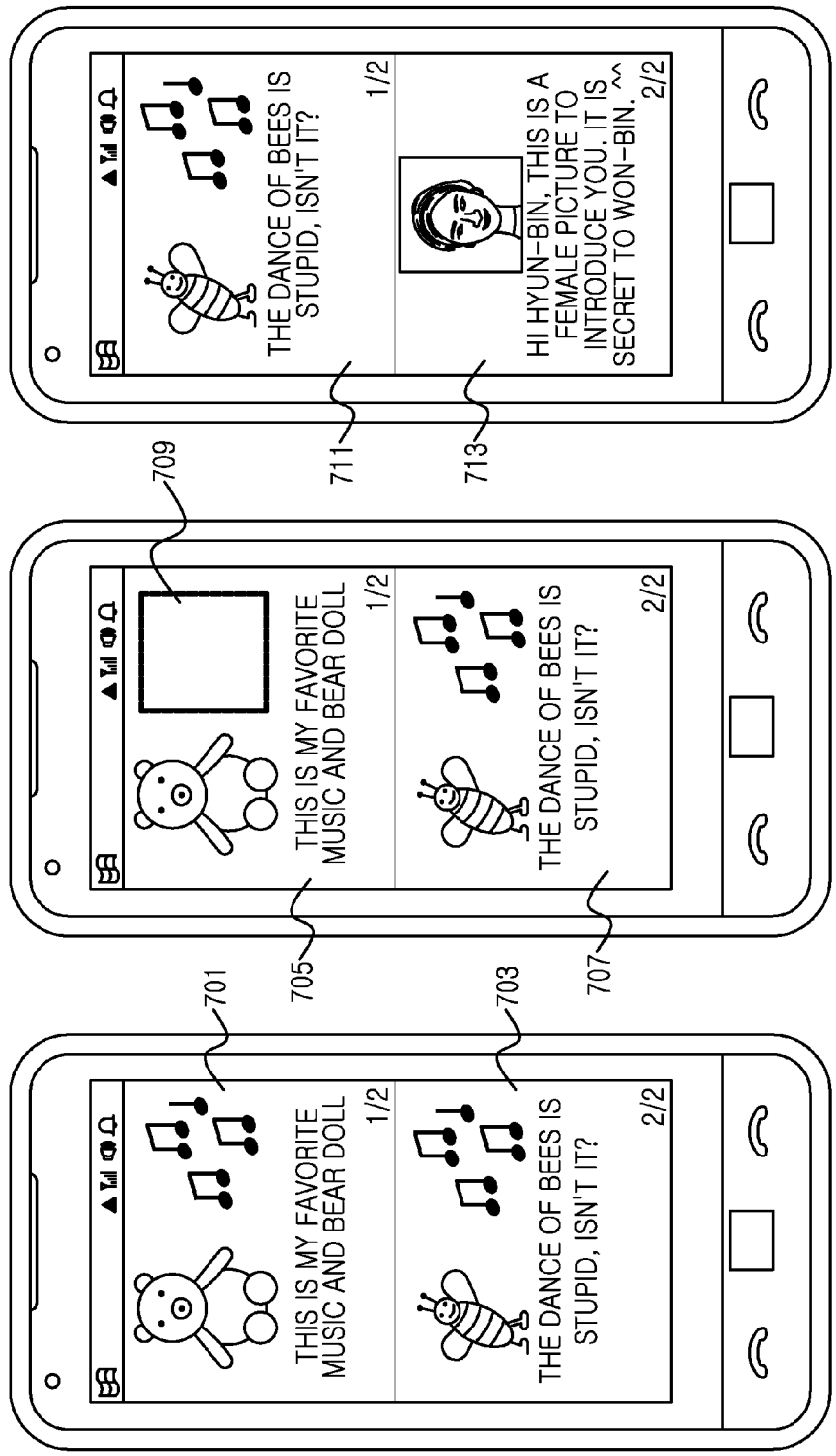

APPARATUS AND METHOD FOR TRANSMITTING MESSAGE IN THE COMMUNICATION SYSTEM

CLAIM OF PRIORITY

The present application is related to and claims the benefit under 35 U.S.C. §119(a) of a Korean patent application filed in the Korean Intellectual Property Office on Nov. 22, 2010 and assigned Ser. No. 10-2010-0116017, the entire disclosure of which is hereby incorporated by reference.

FIELD OF THE INVENTION

The present invention relates to an apparatus and method for transmitting a message in a mobile communication system, and more particularly to an apparatus and a method for processing and transmitting a message for each recipient.

BACKGROUND OF THE INVENTION

In accordance with a rapid advance in the portable terminal technology, a portable terminal has become a vital tool in modern life. The portable terminal has evolved to providing a variety of functions, such as a schedule management, game, mobile internet, and a remote controller via a short distance communication as well as capturing advanced pictures in accordance with the technology advance.

In the functions of above portable terminal, a short message function is most widely used because it provides an inexpensive way to communicate than a voice communication.

Also, since a multimedia message service which is an additional service to add a video, a picture and a music file etc. and achieved by providing multimedia contents as a representative wired and wireless service combining the advantage of the short message service with the advantage of the e-mail service, the usage frequency of the portable terminal is greatly increased in domestic as well as overseas.

The above multimedia message service enables a user to transmit combined files consisting of text, music, image, video, and a link information etc., and can further provide a wireless postcard, picture, video, video card map, and a personnel business card via the multimedia service.

The above multimedia service can simultaneously transmit the same message to a plurality of users. As described above, in order to simultaneously transmit the message to a plurality of users, setting up of plural users as recipients in a written message is necessary. Further, it is possible only in case that message has the same contents.

If a user transmits a message having similar contents to a number of recipients, the user must compile messages corresponding to respective recipients and individually transmit corresponding messages to recipients respectively. In this case, the user has no difficulty in generating respective messages to a plurality of recipients if the message is a short message. However, the user has difficulties in generating an individual message for the respective recipients in case communicating a long message such as a multimedia message.

SUMMARY OF THE INVENTION

To address the above-discussed deficiencies of the prior art, the present invention provides an apparatus and method for processing a message to a plurality of recipients in a mobile communication system.

Another aspect of the present invention is to provide an apparatus and method for distinguishing contents in the message per respective recipient among a plurality of recipients in a mobile communication system.

Still another aspect of the present invention is to provide an apparatus and method for generating a plurality of frames consisting of multimedia contents for transmission to each intended recipient in a mobile communication system.

Yet another aspect of the present invention is to provide an apparatus and method for generating a plurality of frames containing multimedia contents frames with user information included in the respective frames for a subsequent transmission to each intended recipient in a mobile communication system.

In accordance with an aspect of the present invention, an apparatus for transmitting message in a mobile communication system comprises a message generation unit for generating a multimedia message in a plurality of frames including and inserting a recipient identification in the frame for distinction and a controller for transmitting the message to at least two recipients.

In accordance with another aspect of the present invention, a method for transmitting a multimedia message in a plurality of frames in a mobile communication system comprises selectively including a recipient identification and an authorization to access the message in the frame and transmitting the message to at least two recipients, wherein the recipient identification further provides an authorization Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIG. 7 is a screen illustrating a received a message in a receiving portable terminal in accordance with the present invention.

DETAILED DESCRIPTION

The exemplary embodiments of the present invention will be described hereinafter with reference to the accompanying drawings. For the purposes of clarity and simplicity, well-known functions or constructions are not omitted detailed description in case that a detailed description is judged to obscure a major point of the invention.

Hereinafter, the teachings of the present invention will be described for distinguishing the contents included in an original multimedia message, and transmitting the respective content of the message to respective intended recipient in a mobile communication system.

Figure 1:
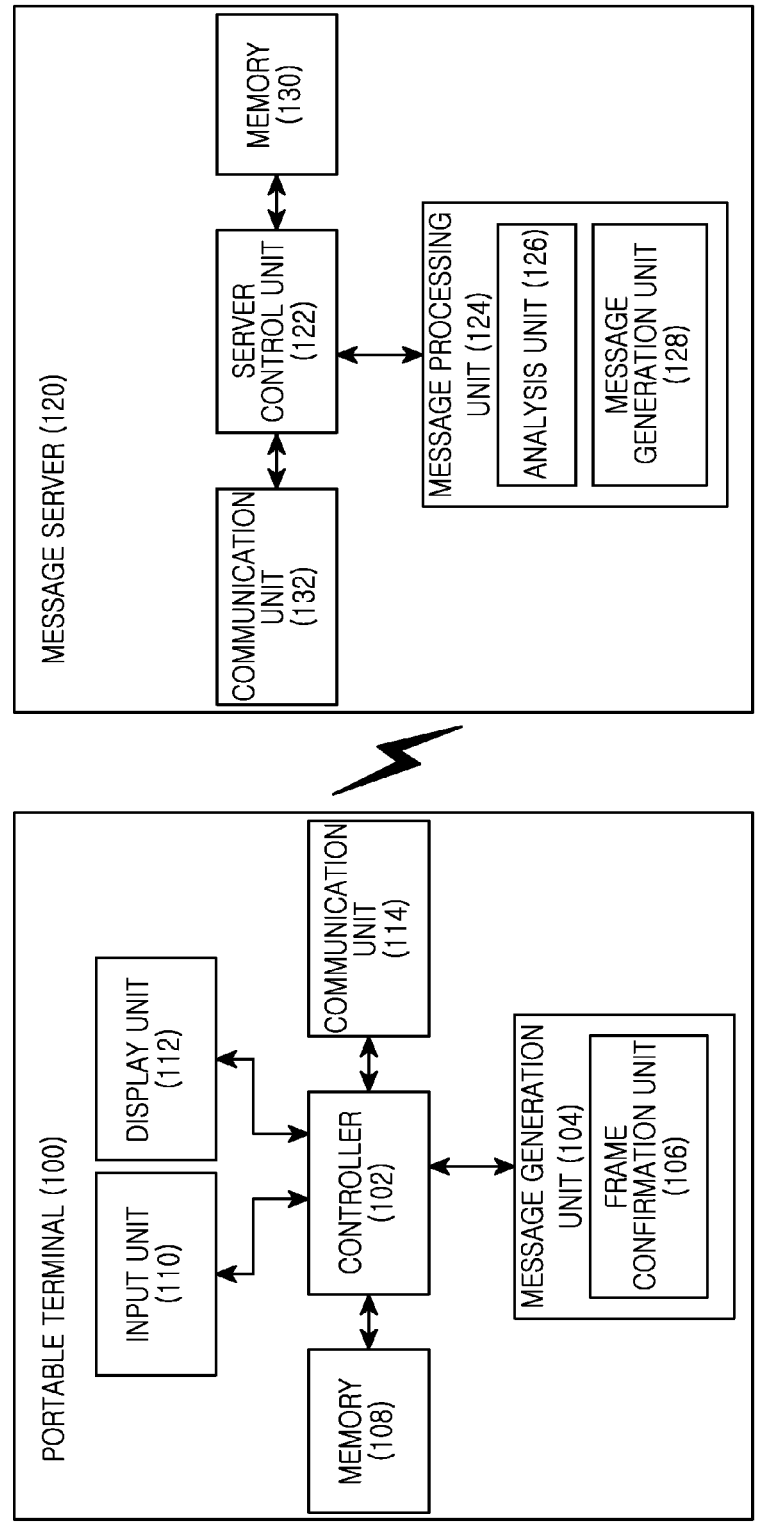
FIG. 1 is a block diagram illustrating the structure of a mobile communication system for generating a message according to the present invention.

FIG. 1 is a block diagram illustrating the structure of a mobile communication system for generating a message according to the present invention.

Referring to FIG. 1, the mobile communication system includes a portable terminal 100 and a message server 120.

The portable terminal 100 may include a controller 102, a message generation unit 104, a memory 108, an input unit 110, a display unit 112, and a communication unit 114. The message generation unit 104 includes a frame identify unit 106.

The controller 102 of the portable terminal 100 controls the overall operation of the portable terminal 100. For example, the controller carries out the process and the control for voice and contents communication. The controller 102 in accordance with the present invention, in addition to a general function, processes to include a recipient identification information in a frame in order to distinguish the content of a message destined for each respective recipient.

The controller 102 controls the message generation unit 104 to generate a message having a plurality of frames constituting multimedia contents and including information in the respective frame corresponding to respective users. Each frame further includes an authorization as to which recipient can access the content of each frame. Here, the message may be one of a pre stored message in the portable terminal, a received message from another portable terminal (not shown) or a service server (not shown), or a message generated by the mobile terminal The message generation unit 104, according to a control from the controller 102, adds frame information to each message frame for identifying an intended recipient. That is, the message generation unit 104 includes a recipient identifications information. The message generation unit 104 distinguishes contents corresponding to at least two recipients in the message using a frame in which information associated with the recipient is included. That is, the message generation unit 104 adds information associated with an intended recipient in the respective frame of the message. The information further includes which frame is accessible to which recipient.

Figure 5:
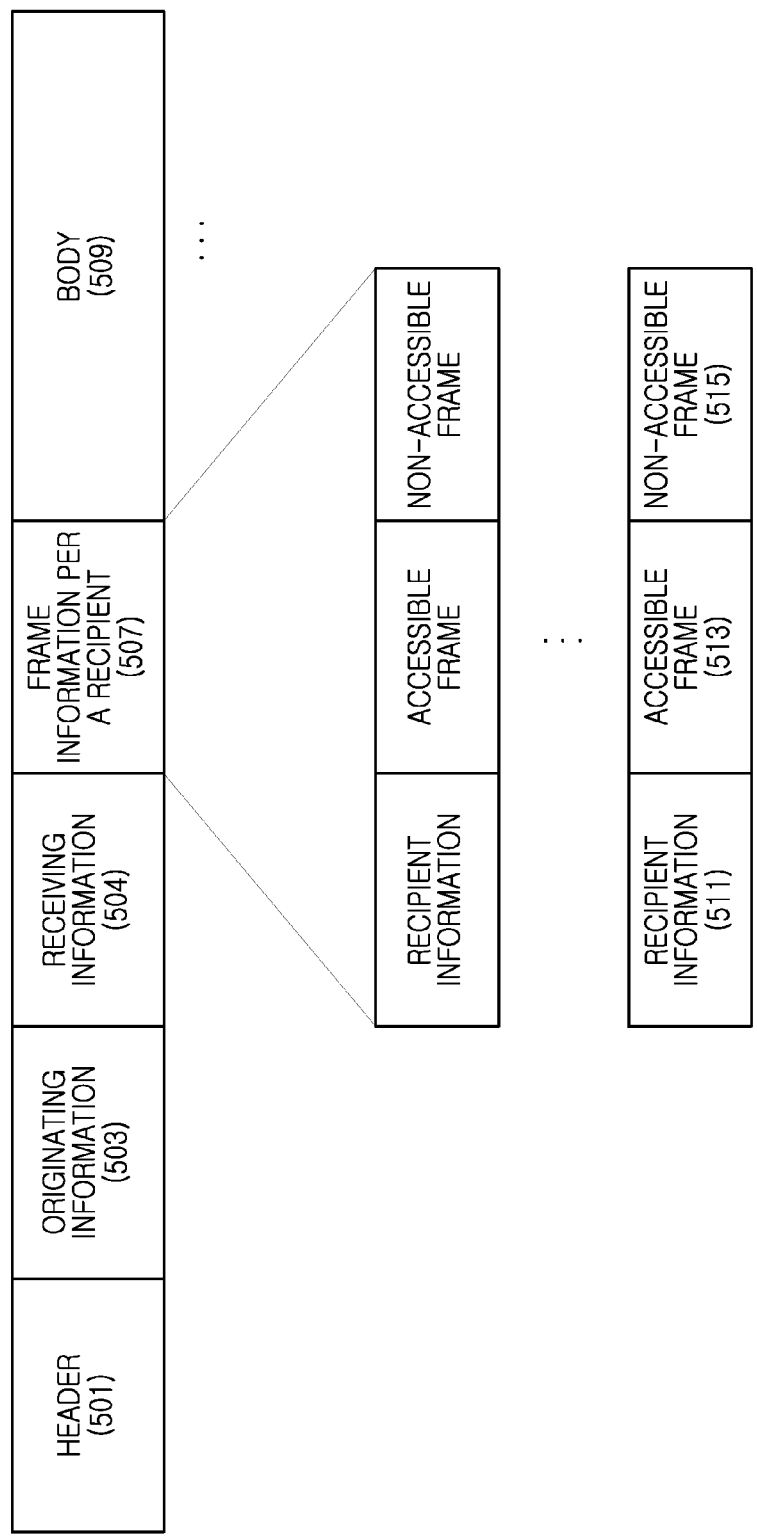
FIG. 5 illustrates the structure of a message generated in the portable terminal.

Therefore, the message generation unit 104 generates the message for at least two recipients and adds information in the message frame in which recipient information and authorization information for the recipient are included. The description on FIG. 5 is referenced.

The frame confirmation unit 106 of the message generation unit 104 provides information for distinguishing the intended recipient. Here, the information in the frame is used to identify which contents are for which recipient among the at least two recipients. Also, contents of the message frame may be text type contents and/or image type contents.

The memory 108 consists of ROM, RAM, and FLASH ROM. 7 he ROM stores the controller 102, micro-code of a program for the process and the control of the message generation unit and all sorts of contents.

The RAM is as a working memory of the controller 102, and stores generated temporary contents while performing all type of programs and functions. Also, the FLASH ROM stores a telephone book and other contents relating to messages.

The input unit 110 consists of number key buttons of 0 to 9, a menu button, a cancel button, a identify button, a communication button, a close button, an Internet connecting button, navigation key (or direction key) buttons, and a plurality of character input keys etc., and provides key input contents corresponding to a key pushed by a user to the controller 100.

The display unit 112 displays a state information generated while operating the portable terminal 100, characters, video contents and still images and the like, and displays only contents corresponding to allowed frame of contents including a message in accordance with the present invention. The display unit 112 can be used a color Liquid Crystal Display (LCD) and is equipped with a touch input device, and can be used as an input device when applying to a portable terminal 100 of the touch input method.

The communication unit 114 carries out a function to transmit and receive a radio signal inputted and outputted via the antenna (not shown). For example, when transmitting contents, the communication unit 114 performs a transmitting function for processing RF signal after the communication unit 114 performs a channel coding and spreading of transmitting contents, when receiving contents, converts an RF signal into a baseband signal, and performs a function for de-spreading and channel decoding of the baseband signal, and restoring contents.

The portable terminal may only transmit a message to a message server 120, and the message server 120 in turn processes to distinguish the contents included in a message corresponding to at least two recipients using a frame information in which information associated with the recipient receiving the frame is included.

In this case, the message server 120 may include a server controller 122, a message processing unit 124, a memory 130, and a communication unit 132. The message processing unit 124 can be included an analysis unit 126 and a message generation unit 128.

The server controller 122 controls the overall operation of the message server 120, processes so as to classify a received frame per a user by analyzing a received message from an originating terminal in accordance with the present invention. Thereafter, the server controller 122 transmits the classified frame to each intended recipient.

The message processing unit 124, according to the control of the server controller 122, analyzes a received message and generates a message for each recipient.

The analysis unit 126 of the message processing unit 124 determines frame information per a recipient included the message. The message generation unit 128 generates the message to each intended recipient using frame information identified by the analysis unit 126.

The memory 130 stores a microcode and all contents of a program. The communication unit 132 receives a message by communicating with the portable terminal 130, and transmits the received message to a corresponding recipient.

The role of the message processing unit 124 of the message server 120 is to perform the teachings of the present invention in the message server 120.

Figure 2:
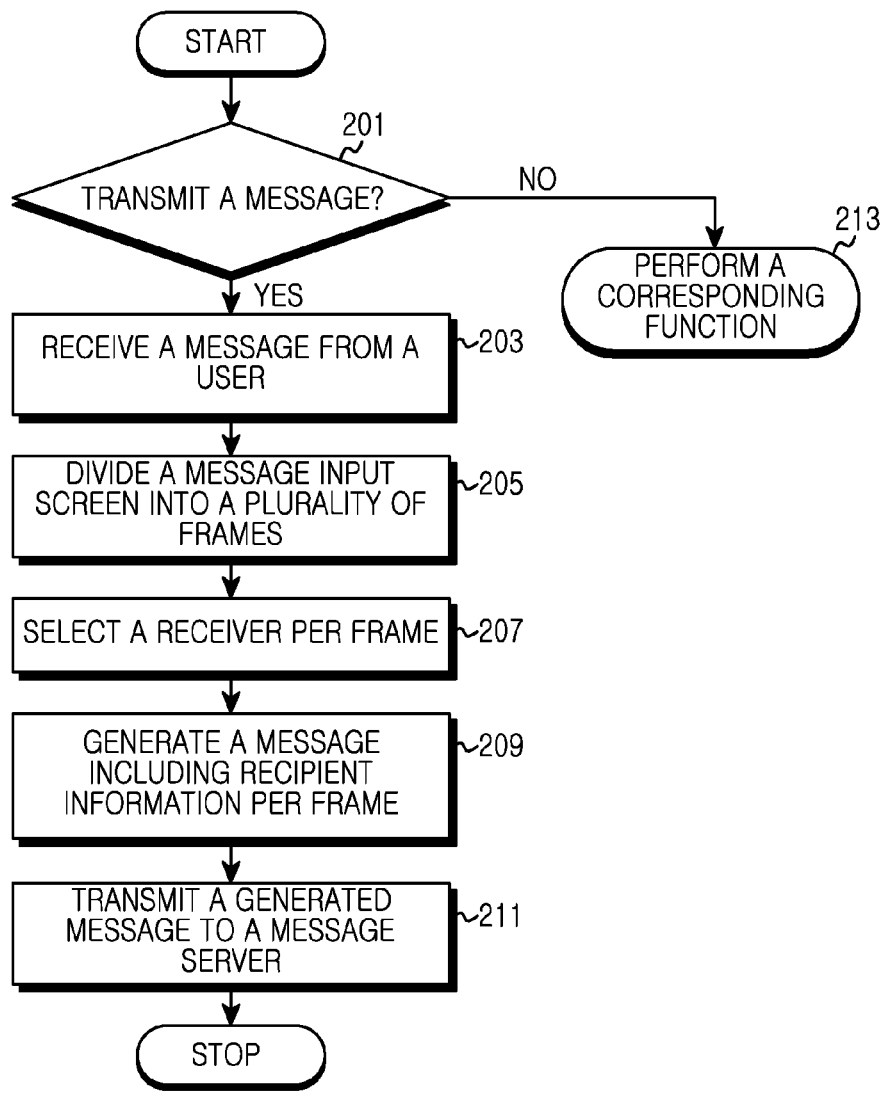
FIG. 2 is a flowchart illustrating a process for transmitting message in a portable terminal according to the present invention.

FIG. 2 is a flowchart illustrating a process for transmitting a message in a portable terminal according to the present invention.

Referring to FIG. 2, the portable terminal generates and transmits a message having different contents to a number of recipients. For example, the portable terminal transmits a message to a user A, and also transmits the same message to a user B but some contents are only intended for the user B and other contents can be accessed only by the user B.

In order to transmit the above message with access limitation, first, the portable terminal identifies whether or not a request for transmitting a message is inputted by a user in block 201. If there is no such a request, the portable terminal proceeds to block 213, and performs a corresponding function (e.g.: waiting mode).

If a request is made in block 201, the portable terminal receives a message including data or contents from a user in block 203. Here, the received message may be a pre-stored in the memory 108, or message may be received from another portable terminal (not shown). Herein, the contents included in the message are at least one of text type character contents, image contents, audio contents and video (multimedia) contents.

Then, the portable terminal proceeds to block 205, and divides a message input screen into a plurality of frames in a display screen. Herein, types of messages and/or pages of messages (Ex: text contents, image contents, video contents, or audio contents) in the frame can be included and further can add text information in each frame prior to the transmission. That is, the users can selectively identify his or her contents by including information in the respective message frame.

Next, the portable terminal selects a user (receiver) intended for each frame in block 207. Here, the frame includes indication as to which contents are allowed to access and which contents are not accessible by different users. To this end, the portable terminal may output a list of recipient names for selection.

Then, the portable terminal proceeds to block 209 and generates a message including the intended recipient (receiving user) indication per frame. Next, the portable terminal proceeds to block 211 and processes to transmit the generated message to the at least two recipients. The message contains the intended recipient(s) per frame and further includes information indicating which recipient is allowed or not allowed to access a certain message frame. A detailed description thereof will be explained with reference to FIG. 5 later.

Figure 3:
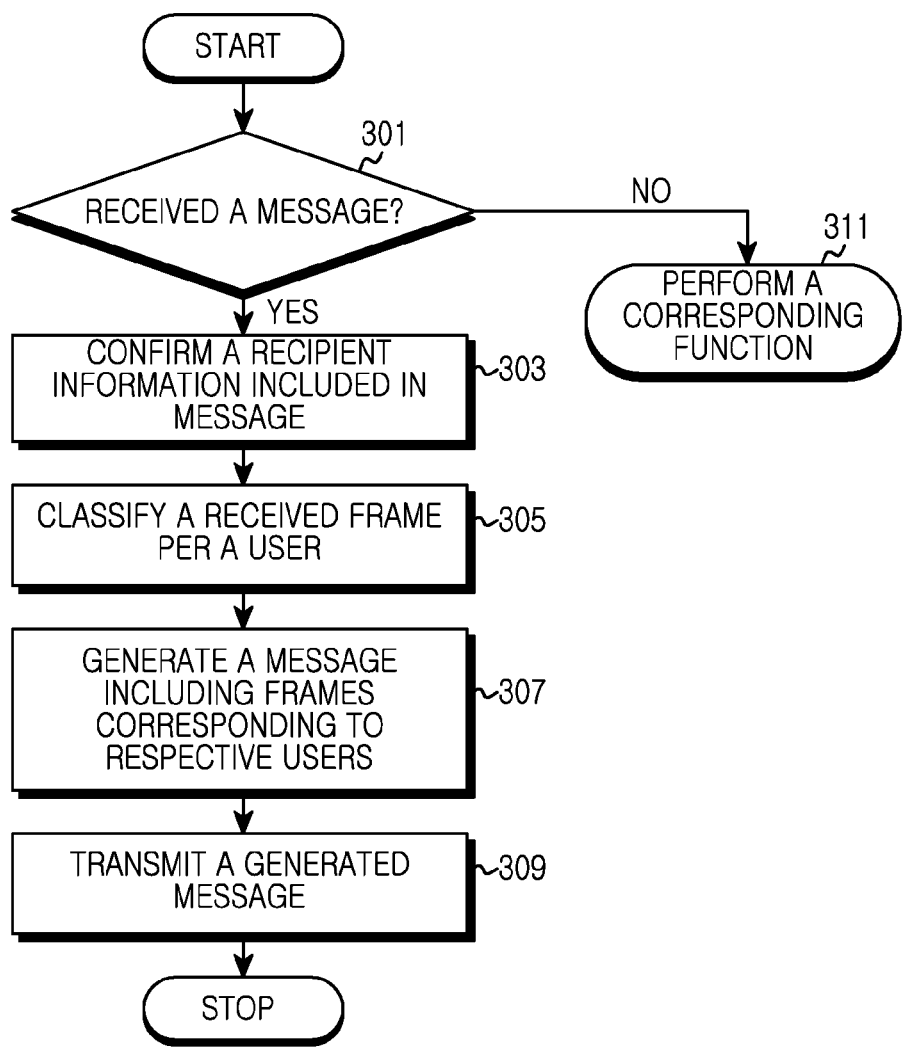
FIG. 3 is a flowchart illustrating a process for processing a message received from the portable terminal in a message server according to the present invention.

FIG. 3 is a flowchart illustrating the process for processing a message received from a portable terminal in a message server according to the present invention.

In operation, the message server transmits a message having different contents for different recipients. Herein, the contents included in the message are at least one of text type character contents, image contents, audio contents and video (multimedia) contents.

Referring to FIG. 3, first, the message server 120 identifies whether or not a message is received from a portable terminal in block 301.

If no, in block 301, the portable terminal proceeds to block 311, and performs a corresponding function (e.g.: waiting mode).

Upon identifying the receipt of the message, the message server 120 in block 303 identifies recipient information included in a message.

Next, the message server 120 classifies frames according to the intended recipient in block 305. Then, in block 307, the message server 120 classified the message frame according to the respective recipient. In block 309, the message server 120 transmits the message to at least two respective users.

Here, for example, the message is a multimedia content intended to recipients A, B, and C. The message may include text contents corresponding to the 1st frame, video contents corresponding to the $2^{nd}$ frame, text contents corresponding to the $3^{rd}$ frame, and image contents corresponding to the 4th frame. The message server 120 identifies an intended recipient per frame. The recipient A may receive only the text contents corresponding to $1^{st}$ frame. The recipient B may receive the text contents corresponding to 1st frame and the $3^{rd}$ frame. The recipient C may receive video contents corresponding to $2^{nd}$ frame and to image contents corresponding to $4^{th}$ frame.

Thus, the message server 120 generates and transmits the message consisting of frame information in which the $1^{st}$ frame is intended for the recipient A, and the $1^{st}$ frame and the $3^{rd}$ frame are intended for the recipient B, and the $2^{nd}$ frame and the $4^{th}$ frame are intended for the recipient C. That is, the message server 120 processes a message received from the portable terminal, and transmits a coined message having frames informing which contents are for which mobile receiver.

Figure 4:
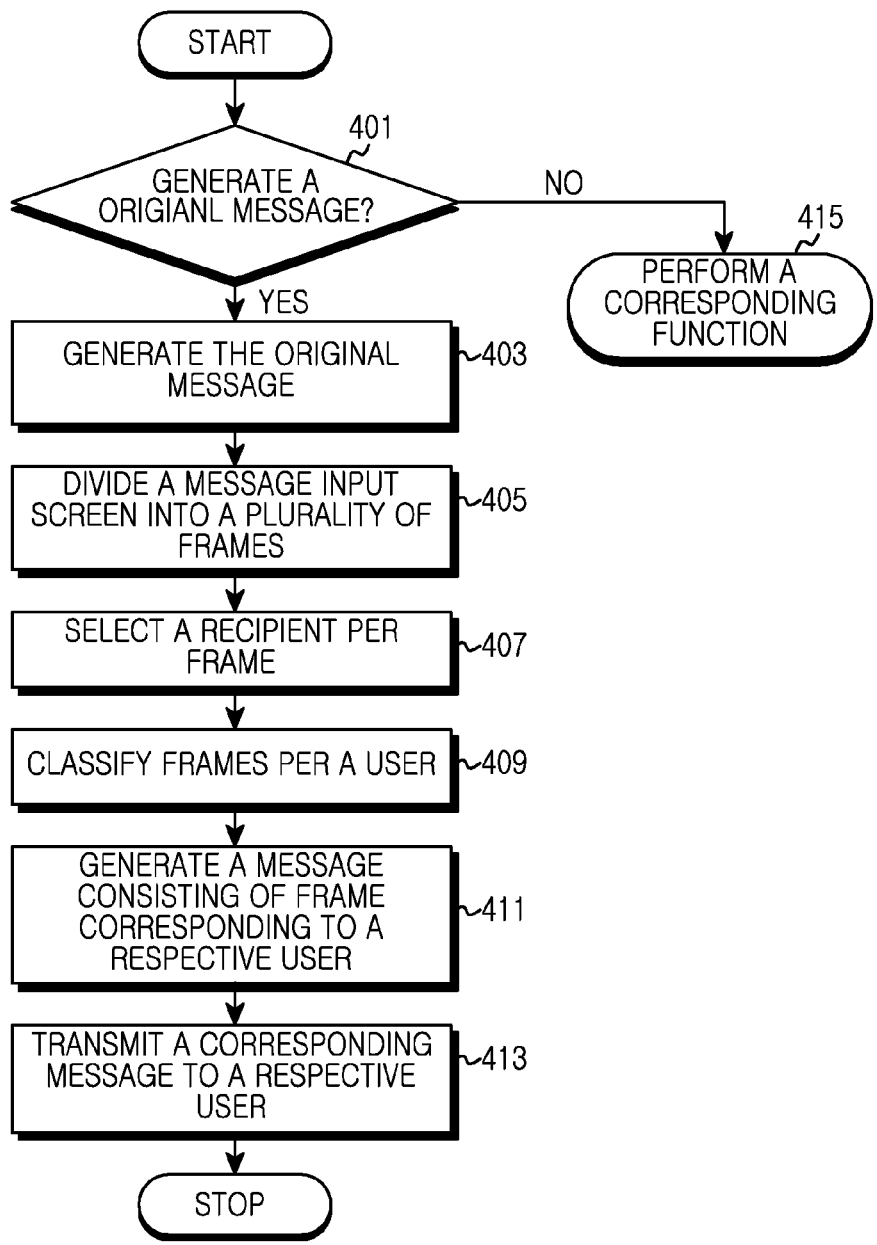
FIG. 4 is a flowchart illustrating a process for transmitting a message of the portable terminal according to another embodiment of the present invention.

FIG. 4 is a flowchart illustrating a process for transmitting a message in the portable terminal according to another embodiment of the present invention.

Referring to FIG. 4, the portable terminal directly generates a message intended for plural receivers.

First, the portable terminal identifies a request for generating a message in block 401.

If no, in block 401, the portable terminal proceeds to block 415, and performs a corresponding function (e.g.: waiting mode).

If yes, in block 401, the portable terminal proceeds to block 403 and generates a message including data or contents. Herein, the contents included in the message are at least one of text type character contents, image contents, audio contents and video (multimedia) contents.

Then, the portable terminal proceeds to block 405, and divides a message input screen into a plurality of frames and indicate which frame is destined for which recipient.

Next, the portable terminal selects an intended recipient per a frame in block 407. Next, in block 409, the corresponding frames are classified as to which contents are allowed to access and which contents are not accessible by different recipients. To this end, the portable terminal may output a list of possible recipients.

In block 411, after formatting the message with an indication for the intended recipients for each frame and an authorization to access or receive each particular frame by different recipients the portable terminal proceeds to block 413 and processes to transmit the message to the at least two recipients. The transmission may be performed via a message server 120.

FIG. 5 displays the structure of a message generated in a portable terminal.

Referring to FIG. 5, the message may include a header 501, originating information 503, receiving information 504, frame information per a user 507 and a body 509.

The header 501 is a field indicating the type of the message and includes information indicating a multimedia message.

The originating information 503 includes information of a mobile user generating the message. The receiving information 504 includes information associated with receiving recipients.

The frame information per a recipient 507 includes information of frame assigned to a respective recipient. In particular, it includes information of recipients 511, and information associated with accessible contents 513 for each recipient and non-accessible contents 515 thereof.

The accessible contents 513 are the contents which are directed to a particular recipient. The non-accessible contents 515 are contents which are directed to the other recipient.

Figure 6:
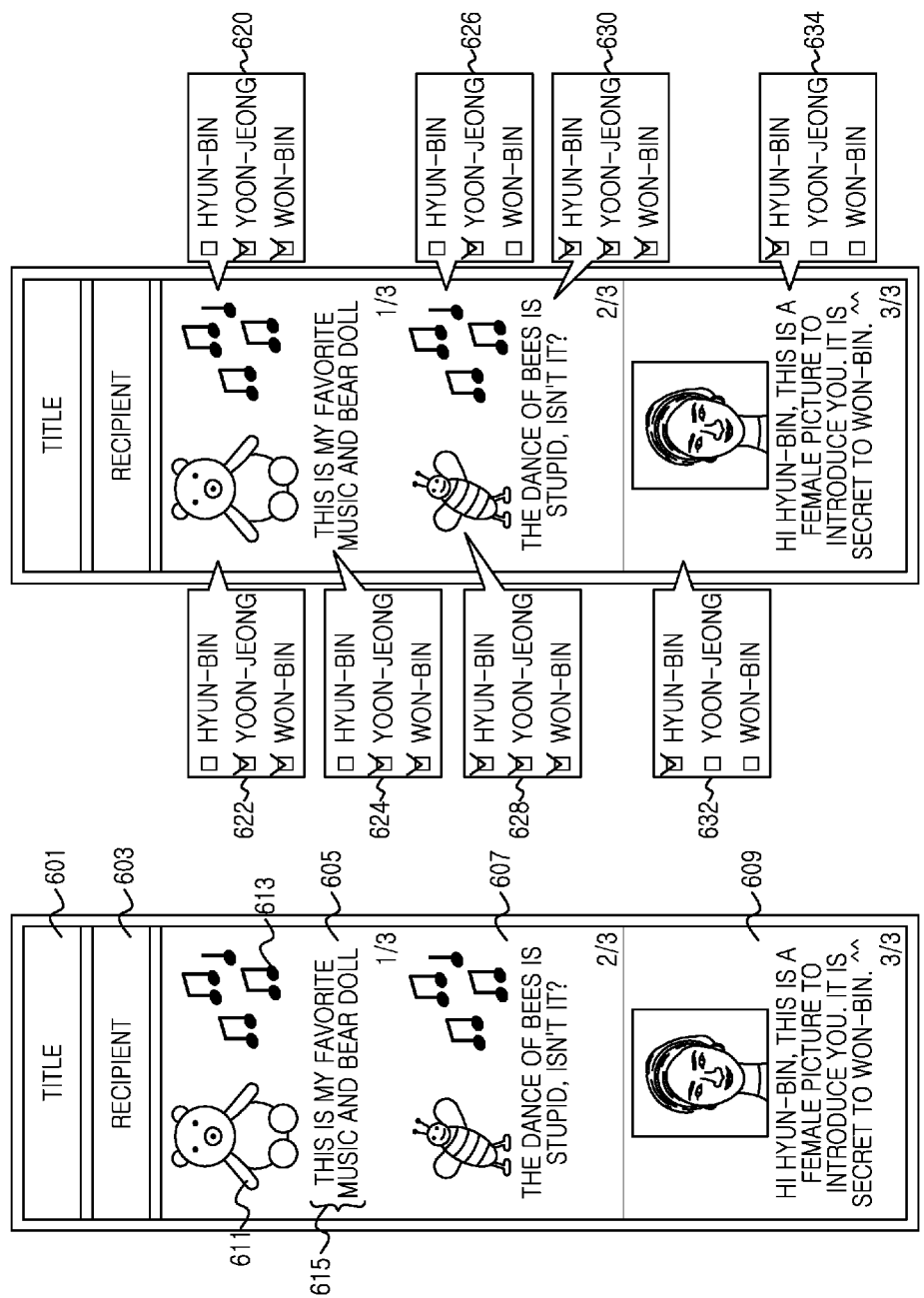
FIG. 6 is a screen illustrating a process for making a message in the portable terminal according to the present invention.

FIG. 6 is a screen illustrating a process for making a message in the portable terminal according to the present invention.

Referring to FIG. 6, the portable terminal generates a multimedia message and outputs a message input (making) screen consisting of a frame, which includes a title 601, a recipient 603 and a message contents upon generating the message.

A user of the portable terminal retrieves, receives or generates a multimedia message including a plurality of contents 605, 607, and 609 (e.g.: text contents, image contents, and music contents and the like). The user is able to select the intended message for each recipient, and then the message can be simultaneously transmitted to a plurality of recipients by inputting about the email addresses of the recipients in the recipient field 603.

As shown in FIG. 6, the $1^{st}$ and $2^{nd}$ page 605 and 607 consists of a frame having an image content 611, a music content 613 and a text content 615. The $3^{rd}$ page 609 comprises the frame structure including an image contents and a text content. For selection, in case that a user of the portable terminal adds HYUN-HIN, YOON-JEONG, and WON-BIN to recipient information, a user outputs a box capable of selecting the recipient is displayed for selection so that a user can directly select a recipient for each frame.

In case that a user selects YOON-JEONG and WON-BIN as a recipient corresponding to a bear doll included in the $1^{st}$ page, the bear doll is shown only two selected recipients.

FIG. 7 is a screen illustrating a received a message in a receiving portable terminal in accordance with the present invention.

Referring to FIG. 7, the portable terminals at the receiving end outputs a receiving message after receiving a message generated in FIG. 6. The receiving terminals selected in FIG. 6 are HYUN-BIN, YOON-JEONG, and WON-BIN.

In response, the portable terminal corresponding to a reference number (a) shown in FIG. 7, outputs a message by receiving a generated message consisting of only frame 701 and 703 set up to YOON-JEONG in FIG. 6. As such, the $3^{rd}$ page 609 corresponding to WON-BIN in FIG. 6 is not received by the recipient YOON-JEONG.

Similarly, the portable terminal corresponding to a reference number (b) shown in FIG. 7 receives a message consisting of only frame 705 and 707 set up to HYUN-BIN in FIG. 6. Thus, the $3^{rd}$ page and music contents of the $2^{nd}$ page corresponding to WON-BIN in an original message in FIG. 6 cannot be shown to the recipient HYUN-BIN.

Lastly, the portable terminal corresponding to a reference number (c) shown in FIG. 7 receives a message consisting of only frame 711 and 713 set up to WON-BIN in the FIG. 6. Thus, the 1st page 605 corresponding to YOON-JEONG and HYUN-BIN in an original message in FIG. 6 cannot be shown to the recipient WON-BIN.

The above-described methods according to the present invention can be implemented in hardware, firmware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

As described above, it should be apparent to those skilled in the art that the present invention provides an advantage during a group message transmission by providing a scheme to distinguish the contents of the message according to the intended recipient, thus the inconvenience and burdensome of repeatedly generating message for each user can be avoided.

While the present invention has been particularly shown and described with reference to exemplary embodiments thereof, it will be understood by those skilled in the art that various changes in form and details may be made therein without departing from the spirit and the scope of the present invention as defined by the appended claims.

What is claimed is:

1. An apparatus for transmitting a message, comprising:
   a message generation unit for generating a message including a plurality of message frames comprising contents, and assigning each message frame to at least one recipient according to at least one user input, such that at least one of the plurality of message frames is assigned to a different set of one or more recipients than another one of the plurality of message frames; and
   a controller for controlling a transmission of the message frames to the message frames' assigned recipients;
   wherein the message generation unit displays a plurality of indications of message frames, the plurality of indications being displayed concurrently, and each one of the plurality of indications corresponding to a different one of the plurality of message frames; and
   wherein, for each indication, the message generation unit displays a list of recipients, receives a respective user selection of one or more recipients, and assigns that indication's respective message frame to the one or more recipients from the indication's respective user selection.

2. The apparatus of claim 1, wherein the contents are received from another portable terminal, are inputted by a user, or are pre-stored in a memory of the apparatus.

3. The apparatus of claim 1, wherein, for each one of the assigned recipients, the message generation unit includes information in the message that identifies frames in the message that have been assigned to the recipient.

4. The apparatus of claim 1, wherein displaying a list of recipients for each indication includes displaying a plurality of lists of recipients, so that a respective list of recipients is displayed for each indication.

5. The apparatus of claim 1, wherein the contents include at least one of text contents, image contents, audio contents, and multimedia contents.

6. The apparatus of claim 1, wherein:
the plurality of message frames are encapsulated in the message together with information identifying the assigned recipients of each one of the plurality of message frames; and
the transmission of the message frames includes transmitting the mesage to a message server for further transmission to the recipients.

7. A method for transmitting a message in a mobile communication system, comprising:
generating a message including a plurality of message frames comprising contents;
displaying, on a display screen, a plurality of indications of the message frames, the plurality of indications being displayed concurrently, and each one of the plurality of indications corresponding to a different one of the plurality of frames;
for each indication, displaying a list of recipients, receiving a respective selection of one or more recipients from the list, and assigning, by a processor, that indication's respective message frame to the one or more recipients from the indication's respective selection, wherein at least one of the plurality of message frames is assigned to a different set of one or more recipients than another one of the plurality of message frames; and
transmitting the message frames to the message frames' assigned recipients.

8. The method of claim 7, wherein the contents are received from another portable terminal, are inputted by a user, or are pre-stored in a memory of the portable terminal.

9. The method of claim 7, wherein transmitting the message frames is performed as part of transmitting the message and for each one of the assigned recipients, the transmitted message includes information that identifies frames in the transmitted message that have been assigned to that recipient.

10. The method of claim 7, wherein displaying a list of recipients for each indication includes displaying a plurality of lists of recipients, so that a respective list of recipients is displayed for each indication.

11. The method of claim 7, wherein the contents include at least one of text contents, image contents, audio contents and multimedia contents.

12. The method of claim 7, wherein the message frames are transmitted to the message frame's assigned recipients via a message server.

13. The method of claim 7, wherein displaying a list of recipients for each message frame includes displaying a list identifying the recipients.

* * * * *

UNITED STATES PATENT AND TRADEMARK OFFICE
CERTIFICATE OF CORRECTION

| | | |
|---|---|---|
| PATENT NO. | : 8,787,951 B2 | Page 1 of 1 |
| APPLICATION NO. | : 13/302069 | |
| DATED | : July 22, 2014 | |
| INVENTOR(S) | : Mi-Sun Lee et al. | |

It is certified that error appears in the above-identified patent and that said Letters Patent is hereby corrected as shown below:

In the Claims

Column 9, Claim 6, Line 14 should read as follows:
--...the message to a...--

Signed and Sealed this
Thirtieth Day of September, 2014

Michelle K. Lee
*Deputy Director of the United States Patent and Trademark Office*